No. 768,694. PATENTED AUG. 30, 1904.
G. R. RICH.
SHAFT COUPLING.
APPLICATION FILED JULY 24, 1903.
NO MODEL.
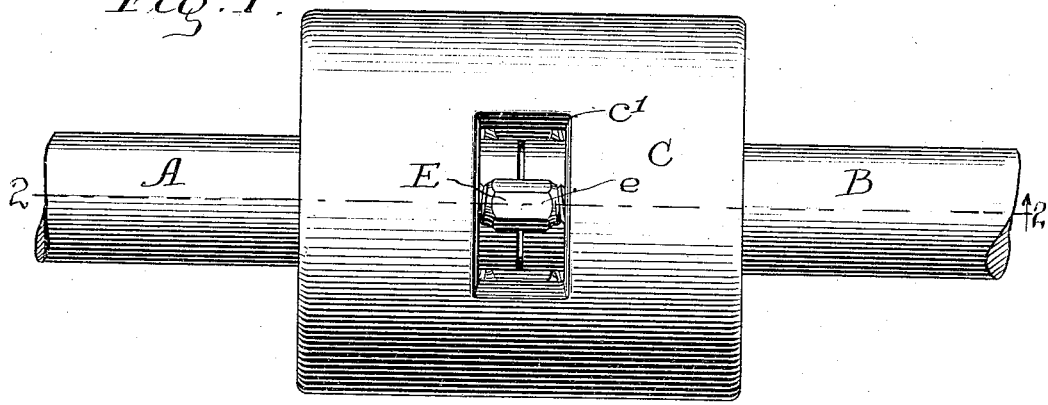
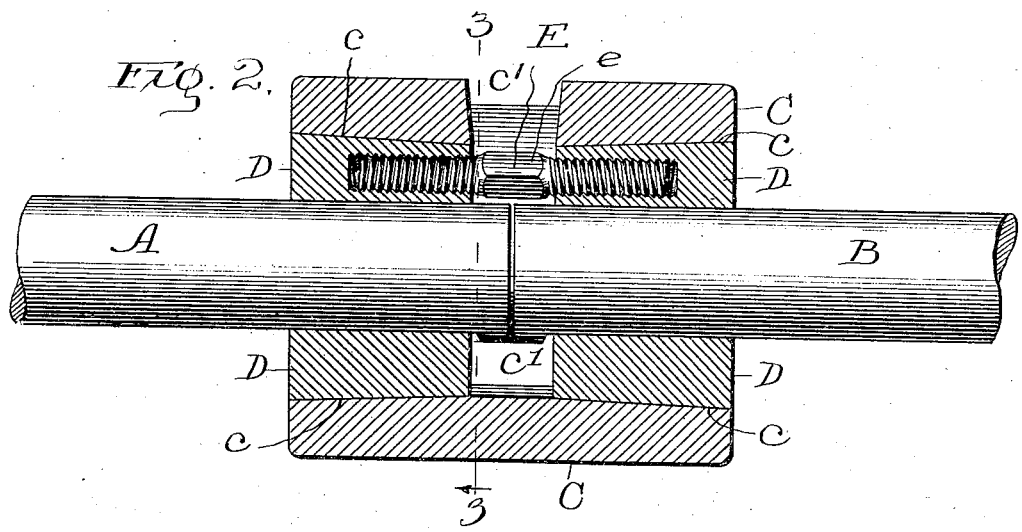
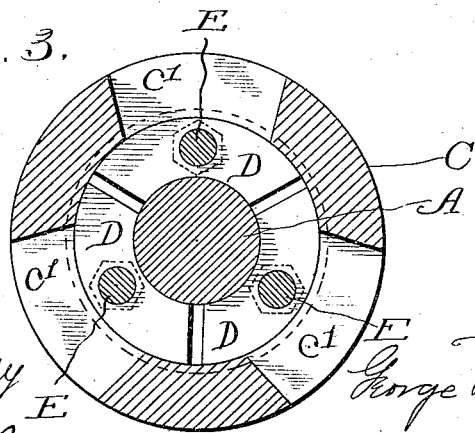
Witnesses:
Chas. O. Sherwey
Mattie B. Bliss.
Inventor:
George R. Rich
by H. Bitner
Atty.

No. 768,694. Patented August 30, 1904.

UNITED STATES PATENT OFFICE.

GEORGE R. RICH, OF CHICAGO, ILLINOIS, ASSIGNOR TO THE GEO. R. RICH MANUFACTURING COMPANY, OF CHICAGO, ILLINOIS, A CORPORATION OF ILLINOIS.

SHAFT-COUPLING.

SPECIFICATION forming part of Letters Patent No. 768,694, dated August 30, 1904.

Application filed July 24, 1903. Serial No. 166,815. (No model.)

*To all whom it may concern:*

Be it known that I, GEORGE R. RICH, a citizen of the United States of America, residing at Chicago, in the county of Cook and State of Illinois, have invented certain new and useful Improvements in Shaft-Couplings, of which the following is a specification.

My invention relates to certain new and useful improvements in shaft-couplings. Its object is to produce a device of this class which shall be extremely simple and cheap and thoroughly effective in every way.

To this end my invention consists in certain novel features of construction, which are clearly illustrated in the accompanying drawings and described in the specification.

In the aforesaid drawings, Figure 1 is a plan of my improved device. Fig. 2 is a section in the line 2 2 of Fig. 1, and Fig. 3 is a section in the line 3 3 of Fig. 2 looking in the direction of the arrow.

Referring to the drawings, A B are the two shafts which are to be secured together by my shaft-coupling.

C is a cylindrical head of larger diameter than the shaft. This head is centrally perforated, and the central perforation is coned at both ends to produce two conical surfaces $c\ c$. Between the head C and the shafts A B are a plurality of segments D, which are cylindrical on their inner surfaces to fit shafts and conical on their outer surfaces to engage with the conical surfaces $c\ c$ on the interior of the head. The number of segments D provided is of course subject to variation; but I prefer to use six segments, three surrounding each shaft. Bolts E, oppositely screw-threaded at their two ends and provided with a central headed portion $e$ for engagement with a wrench, connect the segments D together in pairs. Openings $c'$ are provided in the wall of the head C, by which the bolts can be reached with a suitable wrench.

It should be noticed that the inner conical surfaces of the head are unbroken, so that in the construction of the head these faces can be bored out perfectly to fit the segments, thereby insuring a more perfect alinement of the two shafts which it is desired to couple up.

Furthermore, with this construction no other interlocking devices between the segments and the shafts or between the segments and the head are necessary, the bolts and segments effectually locking the shafts to the head.

The operation of this device will now be readily apparent. The shafts are placed in the proper position and the segments fitted in place. The three bolts E are then screwed up, which draws the segments D together, and as they approach each other they are wedged by engagement with the conical surfaces $c$ into tight contact with the shafts. The shafts can be brought into perfect alinement by turning the proper bolts to produce this result.

I realize that considerable variations are possible in the details of this construction without departing from the spirit of the invention, and I therefore do not intend to limit myself to the specific form herein shown and described.

I claim as new and desire to secure by Letters Patent—

In a shaft-coupling, the combination with two shafts arranged substantially in line, of a hollow head surrounding said shafts, having a plurality of openings in its wall approximately at its middle portion, and having two frusto-conical inner surfaces, flaring outward to its ends, a plurality of pairs of segments arranged between the shafts and the head, the segments being substantially cylindrical upon their inner surfaces to fit the shafts and conical upon their outer surfaces to fit the conical surfaces of the head, and bolts having right and left hand threads, engaging with the pairs of segments to draw them together, independently of each other, to bring the said shafts into alinement, and lock them to each other, said bolts constituting the sole locking means.

In witness whereof I have signed the above application for Letters Patent, at Chicago, in the county of Cook and State of Illinois, this 21st day of July, A. D. 1903.

GEO. R. RICH.

Witnesses:
CHAS. O. SHERVEY,
MATTIE B. BLISS.